United States Patent [19]

Luettgen

[11] Patent Number: 5,264,661
[45] Date of Patent: Nov. 23, 1993

[54] AUTOMOTIVE ELECTRONICS MODULE

[75] Inventor: Michael J. Luettgen, Bloomfield Hills, Mich.

[73] Assignee: Ford Motor Company, Dearborn, Mich.

[21] Appl. No.: 779,750

[22] Filed: Oct. 21, 1991

[51] Int. Cl.⁵ .............................................. H05K 5/06
[52] U.S. Cl. ..................................... 174/52.3; 439/569; 174/52.1
[58] Field of Search ........................ 174/52.1, 52.3, 50, 174/52.2, 52.4; 361/392, 393, 394, 395; 307/9.1, 10.1; 220/4.20, 3.2, 3.8; 206/328; 439/519, 521, 569

[56] References Cited

U.S. PATENT DOCUMENTS

| | | |
|---|---|---|
| 3,062,695 | 11/1962 | Hull . |
| 3,909,504 | 9/1975 | Browne . |
| 4,377,428 | 3/1983 | Toth . |
| 4,546,412 | 10/1985 | Nakazawa et al. . |
| 4,668,873 | 5/1987 | Ohba et al. . |
| 4,709,123 | 11/1987 | Yamashita et al. ................ 174/52.1 |
| 4,766,520 | 8/1988 | Huber et al. . |
| 4,769,745 | 9/1988 | Viernickel et al. ................ 361/433 |
| 4,784,709 | 11/1988 | Unger et al. . |
| 4,899,257 | 2/1990 | Yamamoto . |
| 4,959,018 | 9/1990 | Yamamoto et al. ................ 439/76 |

Primary Examiner—Leo P. Picard
Assistant Examiner—Bot Ledynh
Attorney, Agent, or Firm—Raymond L. Coppiellie; Clifford L. Sadler

[57] ABSTRACT

A hermetically sealed automotive module is disclosed wherein a cover of the module is sealed to a housing of the module by vibration welding. A weld contact surface is defined between the cover and housing of the module when the cover and housing undergo relative reciprocating motion under the application of a force. A method for hermetically sealing a module is also disclosed.

3 Claims, 2 Drawing Sheets

AUTOMOTIVE ELECTRONICS MODULE

BACKGROUND OF THE INVENTION

1. Field of the Invention

The present invention relates generally to automotive electronic control modules. More particularly, the present invention relates to an automotive electronic module enclosing electronic circuitry which is sealed hermetically by vibration welding.

2. Disclosure Information

Automotive underhood electronic modules typically contain delicate circuitry such as integrated circuits, power circuit boards and the like used in various operating systems within the vehicle, such as an anti-lock brake system, an engine control system, multiplex system and others. During use, these modules are subjected to extremely harsh conditions such as heat, moisture, and vibration which could have deleterious effects upon the circuitry within the module if the modules are not sealed. Typically, the modules are sealed with a glue such as shown in U.S. Pat. No. 3,909,504 and/or are filled with a resin or potting material, such as shown in U.S. Pat. Nos. 4,546,412 and 4,899,257. Glueing processes are used in sealing the modules to control the amount of vibration imposed on the module to limit damage to the delicate circuitry inside. However, glueing the modules to seal them is a time-consuming manufacturing process. It would be advantageous to provide an alternative manufacturing process for sealing the modules.

Vibration welding, or friction welding, is a manufacturing process by which two work pieces are reciprocated linearly relative to one another under the application of a force, causing the mating surfaces of the work pieces to soften under the influence of friction. After a weld time interval, the work pieces are returned to their original position and they are held in forced contact for a sufficient length of time for the mating surfaces to solidify. Upon solidification, the force ceases and the work pieces are bonded together. Such a technique is shown in U.S. Pat. No. 4,377,428. It has been heretofore unknown to use vibration welding to seal hermetically an electronics control module for a vehicle because of the potential damage which may be inflicted upon the internal circuitry of the module during the relative vibration of the sealing parts.

It is an object of the present invention to seal hermetically automotive electronic modules containing delicate electronic circuitry therein by vibration welding. These and other objects, features and advantages of the present invention will become apparent from the following summary, description, and claims which follow.

SUMMARY OF THE INVENTION

The present invention provides a method for hermetically sealing an automotive electronics module enclosing electronics circuitry, the module including a housing for receiving the circuitry therein, means disposed in the housing for providing electrical connection between the circuitry and the vehicle, and a cover enclosing the means and the housing, the method comprising the steps of: assembling the circuitry and the connection means in the housing; supporting the housing in a first support means and supporting the cover in a second support means to dispose a planar portion of the cover in abutting contact with a circumferential edge of the housing. The method further comprises the steps of applying a force to the cover in a direction parallel to the longitudinal axis of the housing for causing the cover to be in abutting surface contact with the circumferential edge of the housing and causing the first and second support means to undergo relative linear reciprocating motion along an axis perpendicular to the longitudinal axis of the housing during a predetermined weld-time interval for causing thermoplastic material along the respective abutting contact surfaces to melt to form a first-weld surface, and upon cessation of the reciprocating motion, to rigidify the first-weld surface whereby the cover becomes welded to the housing along the weld surface.

There is also provided herein an automotive module for enclosing electronic circuitry therein comprising a housing having a closed end and an open end and a receiving volume defined therebetween for receiving the circuitry therein, the open end including a circumferential edge extending therearound. The module further includes a cover for enclosing the housing, the cover being welded to the housing along an abutting contact surface between the planar portion of said cover and the circumferential edge of the housing by vibration welding. In one embodiment of the invention, the module may further include connector means for providing electrical connection between the module and the vehicle, the connector including a circumferential lip extending therearound and adapted to be in abutting surface contact with the planar portion of the cover. In this embodiment, the cover can be welded simultaneously to the circumferential lip of the connector means and the circumferential edge of the housing along two weld contact surfaces by vibration welding.

DETAILED DESCRIPTION OF THE PREFERRED EMBODIMENT

Figure 1:
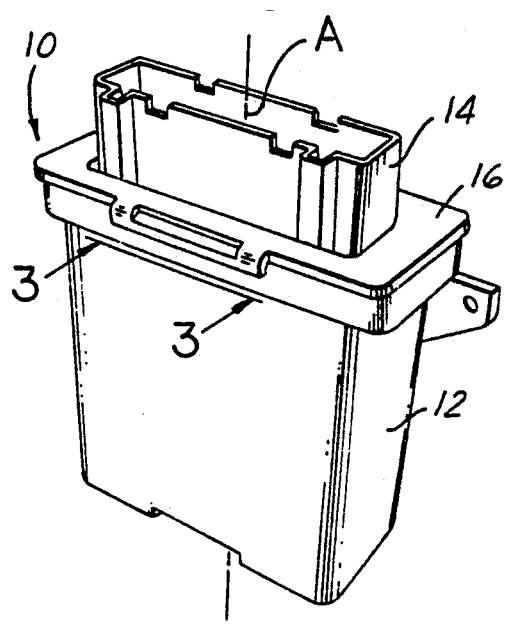
FIG. 1 is a perspective view of an automotive electronic control module structured in accord with the principles of the present invention.

Referring now to the drawings, FIG. 1 shows a perspective view of an anti-lock brake system electronics control module 10 which encloses electronic circuitry for controlling an anti-lock brake system of a vehicle. It should be readily apparent to those skilled in the art that the present invention is not meant to be limited solely to an anti-lock brake system module as described hereinafter, but may suitably be employed with various other automotive modules, such as engine control modules, multiplex modules and the like. The anti-lock brake system module 10 will be used as an example only in the description of the present invention. The module 10 is fabricated from a thermoplastic material, such as ABS, glass-filled nylon, polyester, polypropylene or any of a number of known thermoplastic materials suitable for use in the underhood environment of an automobile.

The module 10 comprises a housing 12 which receives the electronic circuitry therein and a connector 14 for providing electrical connection between the electronic circuitry in the housing 12 and the vehicle. The module also includes a cover 16 for enclosing the module.

Figure 2:
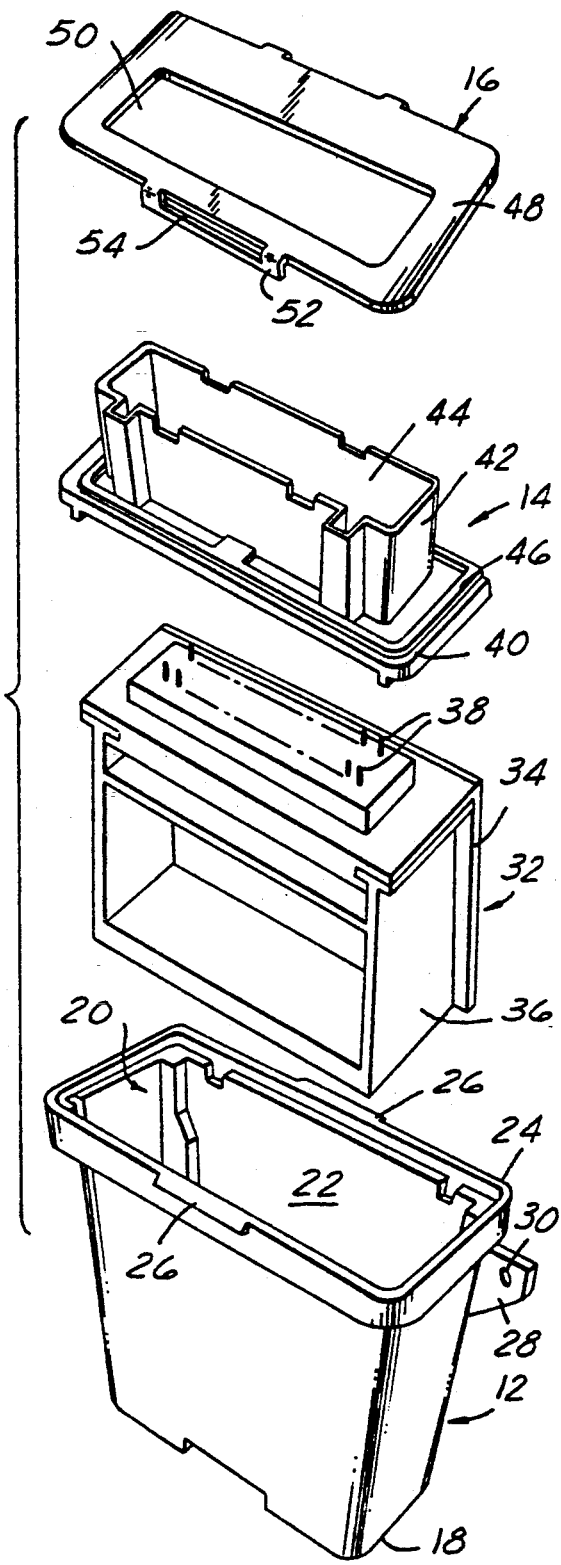
FIG. 2 is an exploded view of the module of FIG. 1.

As shown in FIG. 2, the housing 12 includes a closed-end 18, an open-end 20 and a receiving volume 22 defined therebetween for receiving the electronic circuitry therein. The open-end 20 of housing 12 includes a circumferential edge 24 extending therearound. A pair of locking tabs 26 depend from the circumferential edge 24 temporarily hold the control module assembly together prior to the sealing of the module. The housing 12 also includes a pair of securing tabs 28 having apertures 30 therein for receiving threaded fasteners therethrough to connect the module 10 to the vehicle.

The receiving volume 22 is configured to receive the electronic circuitry, such as shown at 32. In the anti-lock brake system module described in FIG. 2, the electronic circuitry includes a power circuit board 34 containing the control electronics, such as are commonly known in the art. The circuit board is connected to a heat sink 36, typically manufactured of extruded or die cast aluminum as well as a plurality of connector pins 38. The connector pins 38 provide electrical connection means between the circuit board 34 and a mating male connector (not shown) disposed in the vehicle. The circuit board 34 is connected typically to the heat sink through the use of screws or clips, although the present invention is not meant to be limited to the circuitry described herein.

Figure 4:
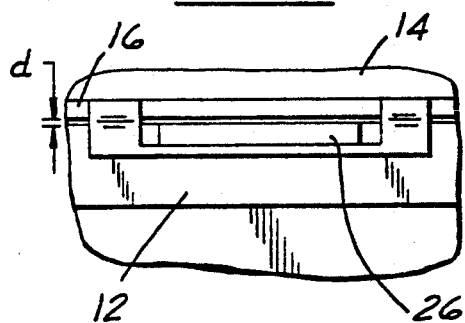
FIG. 4 is an enlarged view of the section of the module of FIG. 1 taken along line 3—3 before the assembly of the module.

The module 10 shown in FIG. 1 further includes a connector 14 having a base portion 40 and a rectangular vertical wall 42 projecting perpendicularly therefrom. The vertical wall 42 defines a volume 44 into which a male mating connector is disposed to connect the vehicle to the control module 10. As such, the connector 14 provides connection means for providing electrical connection between the module and the vehicle. The connector 14 further includes a circumferential lip 46 extending therearound. As can be seen in FIG. 4, the circumferential lip 46 causes a space (d) between the cover 16 and the housing 12 in the assembled, but unsealed condition as will be described below.

Figure 3:
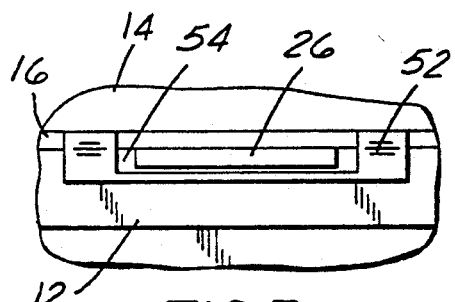
FIG. 3 is an enlarged view of a section of the module of FIG. 1 taken along line 3—3.

The circumferential lip 46 of the connector is configured to abut a generally planar portion 48 of the cover 16. The cover 16 is a generally planar member having the planar portion 48 and an aperture 50 defined therein through which pass the vertical walls 42 of the connector 14. The cover 16 also includes a pair of locking clips 52 having an elongated slot 54 therein for mating engagement with the tabs 26 of the housing 12. The clips 52 temporarily hold the module 10 into an assembled condition prior to the hermetic sealing of the module by the method of the present invention. As can be seen in FIGS. 3 and 4, the elongated slot 54 has a length greater than the length of the tabs 26 of the housing 12. As will be explained herein, this allows for the relative linear reciprocal movement of the cover 16 and the housing 12.

Figure 5:
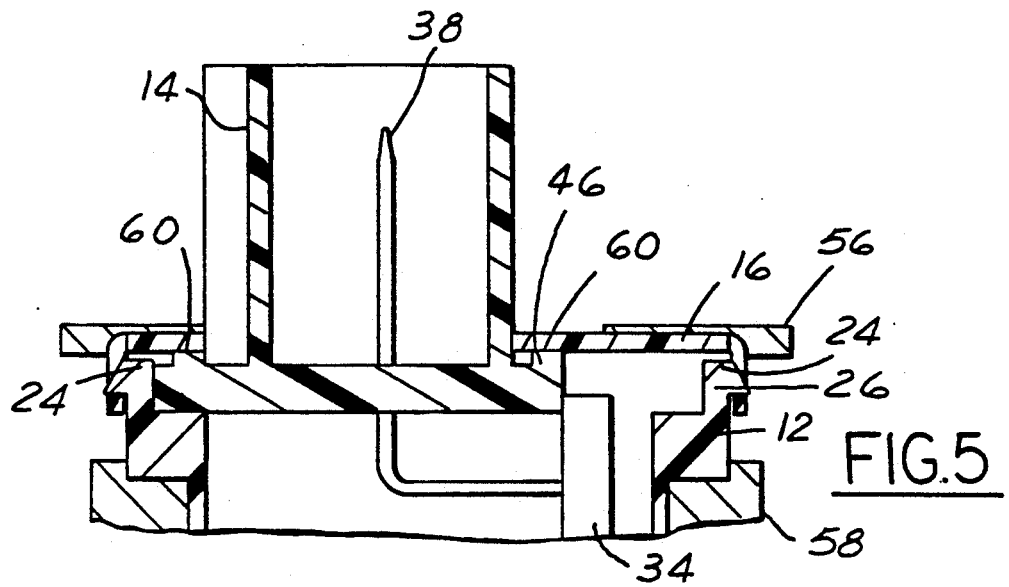
FIGS. 5, 6, and 7 are cross sectional views of an upper portion of the module of FIG. 1 showing the succeeding stages of hermetically sealing the module in accordance with the principles of the present invention.
Figure 6:
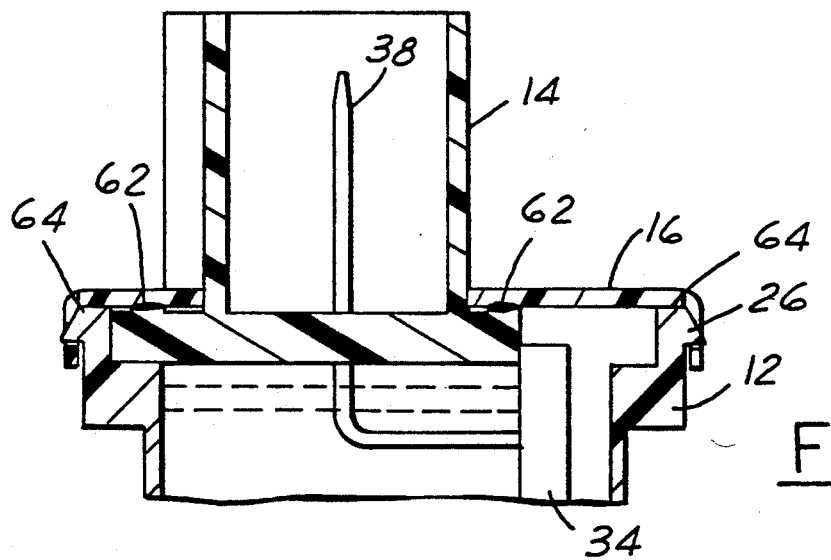
Figure 7:
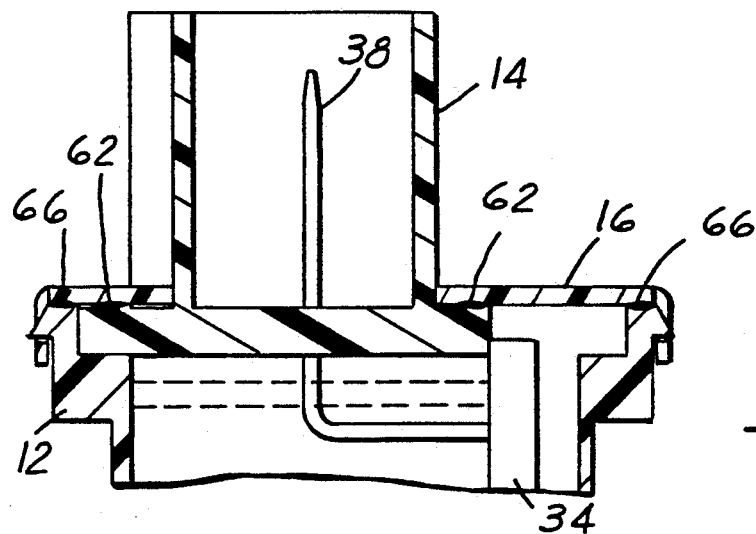

FIGS. 5, 6 and 7, show a cross-sectional view of the upper portion of the module 10 of FIG. 1 in the succeeding stages of sealing the module 10 according to the method of the present invention. FIG. 5 shows the module 10 in an assembled, but unsealed condition, wherein the clips 52 of the cover 16 have engaged the locking tabs 26 of the housing. In FIG. 5, the cover 16 is shown as being press fit or interference fitted into an upper platen 56 of a vibration welding machine while the housing 12 is fit by an interference fit into a lower platen 58 of the vibration welding machine. As such, the upper platen 56 and lower platen 58 comprise a first and second support means configured to undergo relative linear reciprocating motion along an axis perpendicular to the longitudinal axis of the housing (A) during the vibration welding of the module.

The circumferential lip 46 of the connector 14 and the planar portion 48 of the cover 16 define a first abutting contact surface 60 resulting in the spacing (d) described earlier. During the method of the present invention, after the electronic circuitry 32, the connector 14 and the cover 16 have been locked into the assembled condition by the mating engagement of the clips 52 and locking tabs 26, the upper platen 56 and lower platen 58 reciprocate linearly relative to one another along an axis (A) perpendicular to the longitudinal axis of the housing (A) for a weld time of between one and three seconds. The upper platen provides a force, relative to the lower platen, sufficient to produce a pressure at the weld contact surface of between 200–250 pounds per square inch, while the upper platen 56 reciprocates at at a minimum frequency of 150 Hz. In the preferred embodiment, the upper platen 56 reciprocates relative to the lower platen 58 at an approximate frequency of 240 Hz. The application of the force causes the abutting contact surface 60 to melt forming a weld contact surface 62 between the circumferential lip 46 of the connector 14 and the planar portion 48 of the cover 16 as shown at 62 in FIG. 6.

When the weld contact surface 62 is formed, a second abutting contact surface 64 is defined between the circumferential edge 24 of the housing 12 and the planar portion 48 of the cover 16. While the weld at contact surface 62 is still molten, the upper platen 56 and lower platen 58 maintain the reciprocal linear motion while still maintaining the predetermined applied force. This causes the weld contact surface 62 to remain molten while a second weld contact surface, 66 in FIG. 7, is formed between the circumferential edge 24 of housing 12 and the planar portion 48 of the cover 16. After a predetermined weld time interval of between 1–3 seconds, during which weld time the relative linear reciprocating motion of the upper and lower planes as well as the force between the upper and lower planes are maintained, the reciprocating motion is stopped but the force is maintained until the first and second weld surfaces can rigidify, in approximately one second. After the first and second weld surfaces 62, 64 have rigidified, the cover 16 becomes simultaneously welded to the connector 14 and the housing 12 along two weld surfaces, 62, 64. The upper and lower platens are moved apart and the module is then removed from the lower platen and is ready to be installed into a vehicle.

Various modifications and alterations of the present invention will be readily apparent to those of skill in the art. For example, the cover of the module may be sealed hermetically to a housing directly, without the intermediate step of sealing the cover to a connector. This would have beneficial use in modules wherein a connector such as that shown in the detailed description is unnecessary. Accordingly, it is the following claims, including all equivalents, which define the scope of the present invention.

What is claimed is:

1. An automotive module for enclosing electronic circuitry therein for use in an automotive vehicle, comprising:
   a housing having a closed end and an open end and a receiving volume defined therebetween for receiving said circuitry therein, said open end including a circumferential edge extending therearound;
   connector means disposed in said housing for providing electrical connection between said module and said vehicle, said connector means including a circumferential lip extending therearound; and
   a cover for enclosing said housing and said connector means, said cover including a generally planar portion disposed in abutting surface contact with said circumferential edge of said housing and said circumferential lip of said connector means, said cover being welded to said housing along an abutting contact surface between aid planar portion and said circumferential edge by vibration welding.

2. An automotive module according to claim 1, wherein said cover is welded simultaneously to said circumferential lip and said circumferential edge along two weld contact surfaces by vibration welding.

3. An automotive module for enclosing electronic circuitry therein for use in an automotive vehicle, comprising:
   a housing having a closed end and an open end and a receiving volume defined therebetween for receiving said circuitry therein, said open end including a circumferential edge extending therearound;
   a connector disposed in said housing and adapted to provide electrical connection between said module and said vehicle, said connector including a circumferential lip extending therearound; and
   a cover for enclosing said housing and said connector, said cover including a generally planar portion disposed in abutting contact with said circumferential edge and said circumferential lip, said planar portion being adapted to form a pair of weld surfaces along respective abutting contact surfaces between said planar portion and said edge and lip when a force is applied to said cover in a direction parallel to the longitudinal axis of said housing and said housing and cover are linearly reciprocated relative to one another for a predetermined weld time interval under the application of said force, whereby said reciprocating motion causes thermoplastic material along said respective abutting contact surfaces to melt and upon cessation of said motion, said weld surface rigidifies simultaneously to hermetically seal said cover to said housing and said connector.

* * * * *